United States Patent
Stauffer et al.

(10) Patent No.: US 10,708,969 B2
(45) Date of Patent: Jul. 7, 2020

(54) DUAL CONNECTIVITY CAPABILITY MODIFICATION

(71) Applicant: Google LLC, Mountain View, CA (US)

(72) Inventors: Erik Richard Stauffer, Sunnyvale, CA (US); Jibing Wang, Saratoga, CA (US)

(73) Assignee: Google LLC, Mountain View, CA (US)

( * ) Notice: Subject to any disclaimer, the term of this patent is extended or adjusted under 35 U.S.C. 154(b) by 25 days.

(21) Appl. No.: 16/121,368

(22) Filed: Sep. 4, 2018

(65) Prior Publication Data

US 2020/0077458 A1  Mar. 5, 2020

(51) Int. Cl.
| | |
|---|---|
| *H04W 76/15* | (2018.01) |
| *H04W 76/27* | (2018.01) |
| *H04W 72/04* | (2009.01) |
| *H04W 74/08* | (2009.01) |

(52) U.S. Cl.
CPC ....... *H04W 76/15* (2018.02); *H04W 72/0413* (2013.01); *H04W 74/0833* (2013.01); *H04W 76/27* (2018.02)

(58) Field of Classification Search
CPC . H04W 76/15; H04W 76/27; H04W 72/0413; H04W 74/0833
See application file for complete search history.

(56) References Cited

U.S. PATENT DOCUMENTS

| | | | |
|---|---|---|---|
| 9,167,416 B2 | 10/2015 | Kim et al. | |
| 9,622,239 B2 * | 4/2017 | Fukuta | ............. H04W 72/0426 |
| 9,713,044 B2 | 7/2017 | Yamada | |
| 9,763,151 B2 * | 9/2017 | Kim | ........................ H04L 5/00 |
| 10,218,422 B2 | 2/2019 | Raghavan et al. | |
| 2017/0071023 A1 * | 3/2017 | Kunz | ................... H04W 36/28 |
| 2017/0367073 A1 | 12/2017 | Murugan et al. | |
| 2018/0083688 A1 | 3/2018 | Agiwal et al. | |

(Continued)

FOREIGN PATENT DOCUMENTS

| | | |
|---|---|---|
| EP | 2996376 | 3/2016 |
| WO | 2018008944 | 1/2018 |

(Continued)

OTHER PUBLICATIONS

"UE Overheating for EN-DC", 3GPP R2-1802414, UE overheating for EN-DC, in 3GPP TSG-RAN WG2 Meeting #101, Apple Inc., Mar. 2, 2018, 3 pages.

(Continued)

*Primary Examiner* — Kyaw Z Soe
(74) *Attorney, Agent, or Firm* — Colby Nipper PLLC

(57) ABSTRACT

This document describes techniques and devices for communication of dual connectivity (DC) capability by user equipment (110) to a base station (120) and a core network (150) using signaling of a modification of the DC capability of the UE (110) at the physical layer (306) or the media access control layer (308) to reduce the latency of communicating the modification of the DC capability as compared to using Radio Resource Control layer (322) signaling. Signaling a modification of DC capability at the physical layer (306) or media access control layer (308) enables the UE (110) to more quickly respond to issues detected by the UE (110), such as thermal management or in-device coexistence interference, that may be mitigated by discontinuing DC communications.

22 Claims, 6 Drawing Sheets

(56) References Cited

U.S. PATENT DOCUMENTS

| | | | |
|---|---|---|---|
| 2018/0084539 A1* | 3/2018 | Kubota | H04W 8/24 |
| 2018/0220470 A1* | 8/2018 | Zacharias | H04W 76/15 |
| 2019/0098489 A1* | 3/2019 | Shi | H04W 72/1278 |
| 2019/0215740 A1* | 7/2019 | Wu | H04W 48/10 |
| 2019/0230497 A1* | 7/2019 | Ljung | H04W 8/22 |
| 2019/0253945 A1* | 8/2019 | Paladugu | H04W 12/1006 |

FOREIGN PATENT DOCUMENTS

| | | |
|---|---|---|
| WO | 2018010819 | 1/2018 |
| WO | 2018130115 | 7/2019 |

OTHER PUBLICATIONS

Wu, "Handling Overheating in a Wireless—Communication Device", Technical Disclosure Commons; Retrieved from https://www.tdcommons.org/dpubs_series/2343, Jul. 12, 2019, 22 pages.

"Road to 5G: Introduction and Migration", GSMA Apr. 2018, Apr. 2018, 54 pages.

"Downlink Beam Management in NR", 3GPP TSG-RAN WG2 2017 RAN2#98 Meeting, Hangzhou, China, May 15-19, 2017, May 2017, 6 pages.

"International Search Report and Written Opinion", PCT Application No. PCT/US2019/048650, dated Nov. 15, 2019, 13 pages.

\* cited by examiner

DUAL CONNECTIVITY CAPABILITY MODIFICATION

BACKGROUND

The evolution of wireless communication to fifth generation (5G) standards and technologies provides higher data rates and greater capacity, with improved reliability and lower latency that enhances mobile broadband services. 5G technologies also provide new classes of services for vehicular networking, fixed wireless broadband, and the Internet of Things (IoT).

A unified air interface, which utilizes licensed, unlicensed, and shared license radio spectrum in multiple frequency bands is one aspect of enabling the capabilities of 5G systems. The 5G air interface utilizes radio spectrum in bands below 1 GHz (sub-gigahertz), below 6 GHz (sub-6 GHz), and above 6 GHz. Radio spectrum above 6 GHz includes millimeter wave (mmWave) frequency bands that provide wide channel bandwidths to support higher data rates for wireless broadband. Another aspect of enabling the capabilities of 5G systems is the use of Multiple Input Multiple Output (MIMO) antenna systems to beamform signals transmitted between base stations and user equipment to increase the capacity of 5G radio networks.

To support the transition to 5G networks, multiple radio access technology connectivity enables a user equipment (UE) to simultaneously connect to Evolved Universal Terrestrial Radio Access (E-UTRA) and 5G base stations. The UE indicates its capability for dual connectivity to a base station; however, circumstances may arise, such as thermal management or in-device coexistence interference in which the UE may benefit from rapidly modifying and communicating its capability for dual connectivity.

SUMMARY

This summary is provided to introduce simplified concepts of dual connectivity capability modification. The simplified concepts are further described below in the Detailed Description. This summary is not intended to identify essential features of the claimed subject matter nor is it intended for use in determining the scope of the claimed subject matter.

In some aspects, a method for communicating a modification of dual connectivity (DC) capability by a user equipment (UE) in a cellular network is described in which the UE transmits an Attach Request message to a first base station, the Attach Request message including a first indication of a DC capability of the UE. In response to transmitting the DC capability, the UE establishes DC communication with the first base station and a second base station. The UE determines to modify the DC capability of the UE and transmits, using other than Radio Resource Control (RRC) signaling, the modified DC capability as a second indication of DC capability of the UE. Based at least in part on the modified DC capability of the UE, the UE discontinues DC communications via the first base station and the second base station.

In other aspects, a base station configured as a Master Node (MN) for Dual Connectivity (DC) communication includes a radio frequency (RF) transceiver, a core network interface, an inter-base station interface, and a processor and memory system to implement a base station manager application. The base station manager application is configured to receive, via the RF transceiver, an Attach Request message from a user equipment (UE) including a first indication of a Dual Connectivity (DC) capability of the UE and, in response to the reception of the first indication of the DC capability of the UE, establish DC communication for the UE including configuring another base station as a Secondary Node (SN) via the inter-base station interface. The base station manager application is configured to receive, using other than Radio Resource Control (RRC) signaling, a second indication of the DC capability of the UE that indicates a modification of the DC capability of the UE and relay the second indication of the DC capability of the UE to a core network using the core network interface. Based on the reception of the modified DC capability of the UE, the base station manager application configures, via the inter-base station interface, the other base station to discontinue DC with the UE.

In further aspects, a method for communicating a user equipment (UE) capability for multi-Radio Access Technology (Multi-RAT) Dual Connectivity (DC) by a base station is described, in which the base station receives an Attach Request message from the UE including a first indication of a DC capability of the UE and, in response to the receiving the DC capability of the UE, establishes DC communication for the UE including configuring another base station as a Secondary Node (SN). The base station receives, using other than Radio Resource Control (RRC) signaling, a second indication of the DC capability of the UE that indicates a modification of the DC capability of the UE and relays the second indication of the DC capability to a core network. Based on the receiving the modified DC capability of the UE, the base station configures, via the inter-base station interface, the other base station to discontinue DC with the UE.

BRIEF DESCRIPTION OF THE DRAWINGS

Aspects of dual connectivity capability modification are described with reference to the following drawings. The same numbers are used throughout the drawings to reference like features and components.

DETAILED DESCRIPTION

Overview

Figure 1:
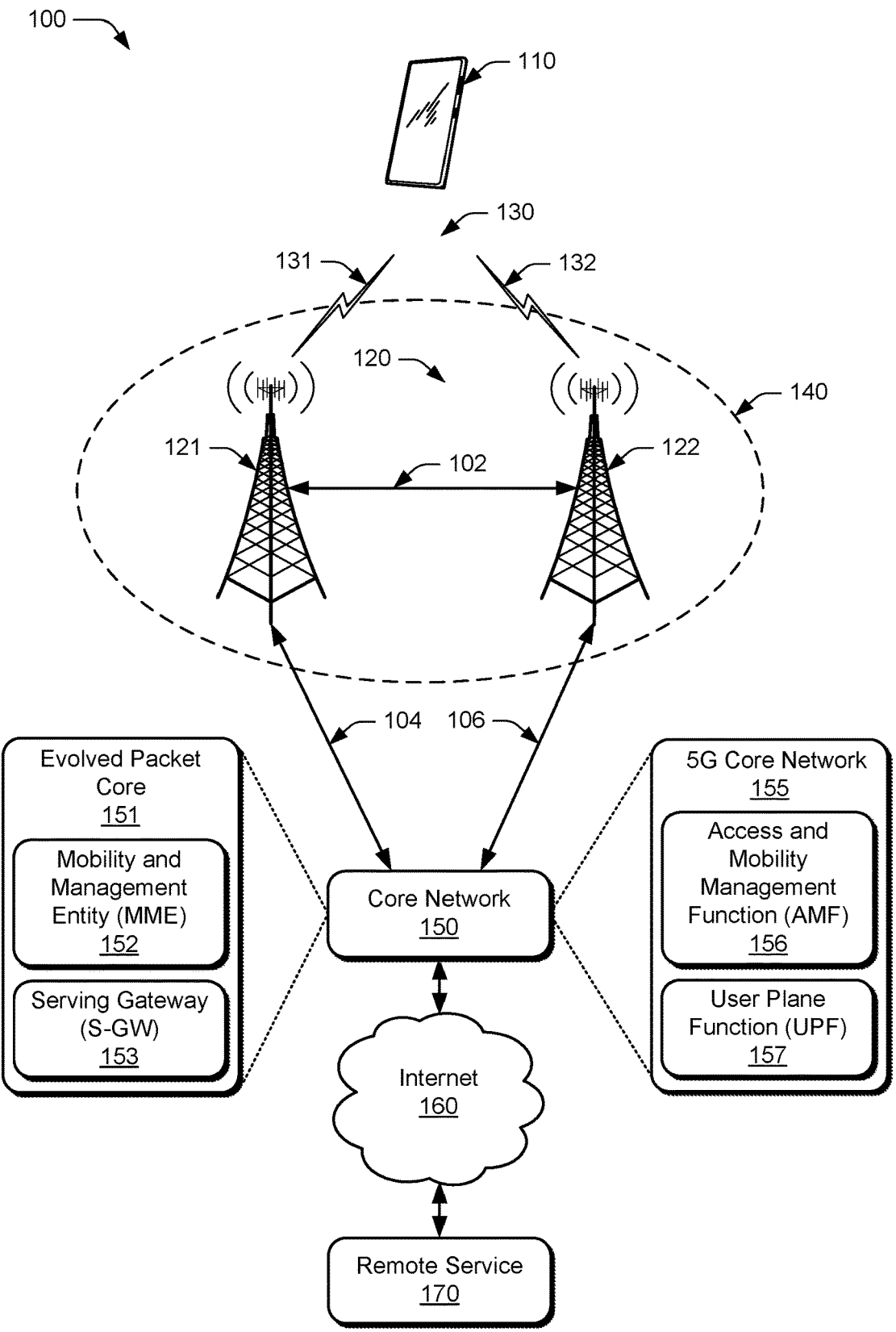
FIG. 1 illustrates an example wireless network environment in which various aspects of dual connectivity capability modification can be implemented.

This document describes techniques and devices for the communication of dual connectivity (DC) capability by user equipment (UE) to a base station and a core network using signaling of a modification of the DC capability of the UE at the physical layer or the media access control layer to reduce the latency of communicating the modification of the DC capability as compared to using Radio Resource Control layer signaling. Signaling a modification of DC capability at the physical layer or media access control layer enables the UE to more quickly respond to issues detected by the UE, such as thermal management or in-device coexistence issues, that may be mitigated by discontinuing DC communications.

A UE may have the capability to use Dual Connectivity (DC) to simultaneously communicate with an Evolved Universal Terrestrial Radio Access (E-UTRA) base station and a Fifth Generation (5G) New Radio (NR) base station. This is generically called Multi-RAT Dual Connectivity (MR-DC). When the E-UTRA base station act as a Master Node (MN) and the 5G NR base station acts as a Secondary Node (SN) for DC communication, and both the E-UTRA base station and the NR base station are connected to a Mobility Management Entity (MME) and a Serving Gateway (S-GW) in an Evolved Packet Core (EPC) network, this provides E-UTRA-NR Dual Connectivity (EN-DC) for the UE. Alternatively, when the E-UTRA base station acts as the MN and the 5G NR base station acts as the SN for DC communication, and both the E-UTRA base station and the NR base station are connected to an Access and Mobility Management Function (AMF) and a User Plane Function (UPF) in a 5G core network, the MR-DC configuration is referred to as NGEN-DC. A third MR-DC configuration, called NE-DC, involves a 5G NR base station acting as a MN and an E-UTRA base station acting as a SN with both base stations connected to a 5G core network.

Additionally, the techniques for dual connectivity capability modification described herein apply equally to single-RAT dual connectivity in cases where the MN and the SN are both E-UTRA base stations or the MN and SN are both 5G NR base stations. In the case where the MN and SN are E-UTRA base stations, both base stations are connected to the MME and the S-GW in the EPC network. In the other case where the MN and SN are 5G NR base stations, both base stations are connected to the AMF and the UPF in the 5GC network.

The UE provides an indication in an Attach Request message to the core network, via either the MN or the SN, that it has the capability to communicate using DC. During operations using DC, there may be circumstances detected by the UE, such as in-device coexistence issues, overheating, or the like, that may cause the UE to determine to discontinue operating using DC to address the detected issue. When the detected issue resolves, the UE may determine to resume DC operation.

The UE can signal a change in DC capability to the MN or SN using Radio Resource Control signaling. Although the UE continues to have the technical ability to operate using MR-DC, this capability signaling indicates that the UE's current capacity for DC operation has changed.

To reduce the latency of signaling the change in DC capability, the UE may signal the change in DC capability in Uplink Control Information (UCI) at a physical level entity or using a Control Element (CE) at a Media Access Control (MAC) level entity to enable resources for the DC communications to be released more quickly. Alternatively, the MN may allocate a Random Access Channel (RACH) resource to signal DC capability modification, in which case the UE may transmit the modification to the DC capability using the allocated RACH resource via a Physical Random Access Channel (PRACH).

While features and concepts of the described systems and methods for dual connectivity capability modification can be implemented in any number of different environments, systems, devices, and/or various configurations, aspects of dual connectivity capability modification are described in the context of the following example devices, systems, and configurations.

Example Environment

FIG. 1 illustrates an example environment 100 which includes a user equipment 110 (UE 110) that can communicate with one or more base stations 120 (illustrated as base stations 121 and 122) through one or more wireless communication links 130 (wireless link 130), illustrated as wireless links 131 and 132. In this example, the user equipment 110 is implemented as a smartphone. Although illustrated as a smartphone, the user equipment 110 may be implemented as any suitable computing or electronic device, such as a mobile communication device, a modem, cellular phone, gaming device, navigation device, media device, laptop computer, desktop computer, tablet computer, smart appliance, vehicle-based communication system, and the like. The base stations 120 (e.g., an Evolved Universal Terrestrial Radio Access Network Node B, E-UTRAN Node B, evolved Node B, eNodeB, eNB, Next Generation Node B, gNode B, gNB, or the like) may be implemented in a macrocell, microcell, small cell, picocell, and the like, or any combination thereof.

The base stations 120 communicate with the UE 110 via the wireless links 131 and 132, which may be implemented as any suitable type of wireless link. The wireless links 131 and 132 can include a downlink of data and control information communicated from the base stations 120 to the UE 110, an uplink of other data and control information communicated from the UE 110 to the base stations 120, or both. The wireless links 130 may include one or more wireless links or bearers implemented using any suitable communication protocol or standard, or combination of communication protocols or standards such as 3rd Generation Partnership Project Long-Term Evolution (3GPP LTE), Fifth Generation New Radio (5G NR), and so forth. Multiple wireless links 130 may be aggregated in a carrier aggregation to provide a higher data rate for the UE 110. Multiple wireless links 130 from multiple base stations 120 may be configured for Coordinated Multipoint (CoMP) communication with the UE 110, as well as dual connectivity, such as single-RAT LTE-LTE or NR-NR dual connectivity or Multi-Radio Access Technology (Multi-RAT) Dual Connectivity (MR-DC) including EN-DC, NGEN-DC, and NE-DC.

The base stations 120 are collectively a Radio Access Network 140 (RAN, Evolved Universal Terrestrial Radio Access Network, E-UTRAN, 5G NR RAN or NR RAN). The base stations 121 and 122 are connected to a core network 150 via control-plane and user-plane interfaces at links 104 and 106. In EN-DC, the core network 150 is an Evolved Packet Core 151 (EPC 151) that includes a Mobility Management Entity 152 (MME 152) that provides control-plane functions such as registration and authentication of multiple UE 110, authorization, mobility management, or the like. The EPC 151 includes a Serving Gateway 153 (S-GW 153) that relays user-plane data between UEs 110 and the Internet 160 and a remote service 170. In NGEN-DC and NE-DC, the core network 150 is a 5G core network 155

(5GC 155) that includes an Access and Mobility Management Function 156 (AMF 156) that provides control-plane functions such as registration and authentication of multiple UE 110, authorization, mobility management, or the like. The 5GC 155 includes a User Plane Function 157 (UPF 157) that relays user-plane data between UEs 110 and the Internet 160 and the remote service 170.

In one aspect, when the UE 110 is using EN-DC, the UE 110 communicates with the base station 121, which acts as a Master Node (MN), and the wireless link 131 is an E-UTRA link. The UE 110 also communicates with the base station 122, which acts as a Secondary Node (SN) and the wireless link 132 is a 5G NR link. At link 102 the base station 121 and the base station 122 can communicate user-plane and control-plane data via an X2 interface. The base station 121 communicates control plane information with the MME 152 in the EPC 151 via an S1-MME interface and relays control-plane information to the base station 122 via the X2 interface.

In another aspect, when the UE 110 is using NGEN-DC, the UE 110 communicates with the base station 121, which acts as the Master Node (MN), and the wireless link 131 is an E-UTRA link. At link 102 the base station 121 and the base station 122 can communicate user-plane and control-plane data via an Xn interface. The base station 121 communicates control plane information with the AMF 156 in the 5GC 155 via an NG-C interface and relays control-plane information to the base station 122 via the Xn interface.

In a further aspect, when the UE 110 is using NE-DC, the UE 110 communicates with the base station 121, which is a 5G NR base station, and acts as the Master Node (MN) and the wireless link 131 is an 5G NR link. The base station 122, which is an E-UTRA base station, acts as the Secondary Node (SN) and the wireless link 132 in an E-UTRA link. At link 102 the base station 121 and the base station 122 can communicate user-plane and control-plane data via the Xn interface. The base station 121 communicates control plane information with the AMF 156 in the 5GC 155 via the NG-C interface and relays control-plane information to the base station 122 via the Xn interface.

Turning from an MR-DC configuration, the FIG. 1 environment may also represent a single-RAT DC configuration. In one type of single-RAT DC situation, both base stations 121, 122 are E-UTRA base stations and can communicate user-plane and control-plane data via an X2 interface over link 102, and both base stations link 104, 106 to an EPC 151. In another type of single-RAT DC situation, both base stations 121, 122 are 5G NR base stations and can communicate user-plane and control-plane data via an Xn interface over link 102, and both base stations link 104, 106 to a 5G core network 155.

Figure 2:
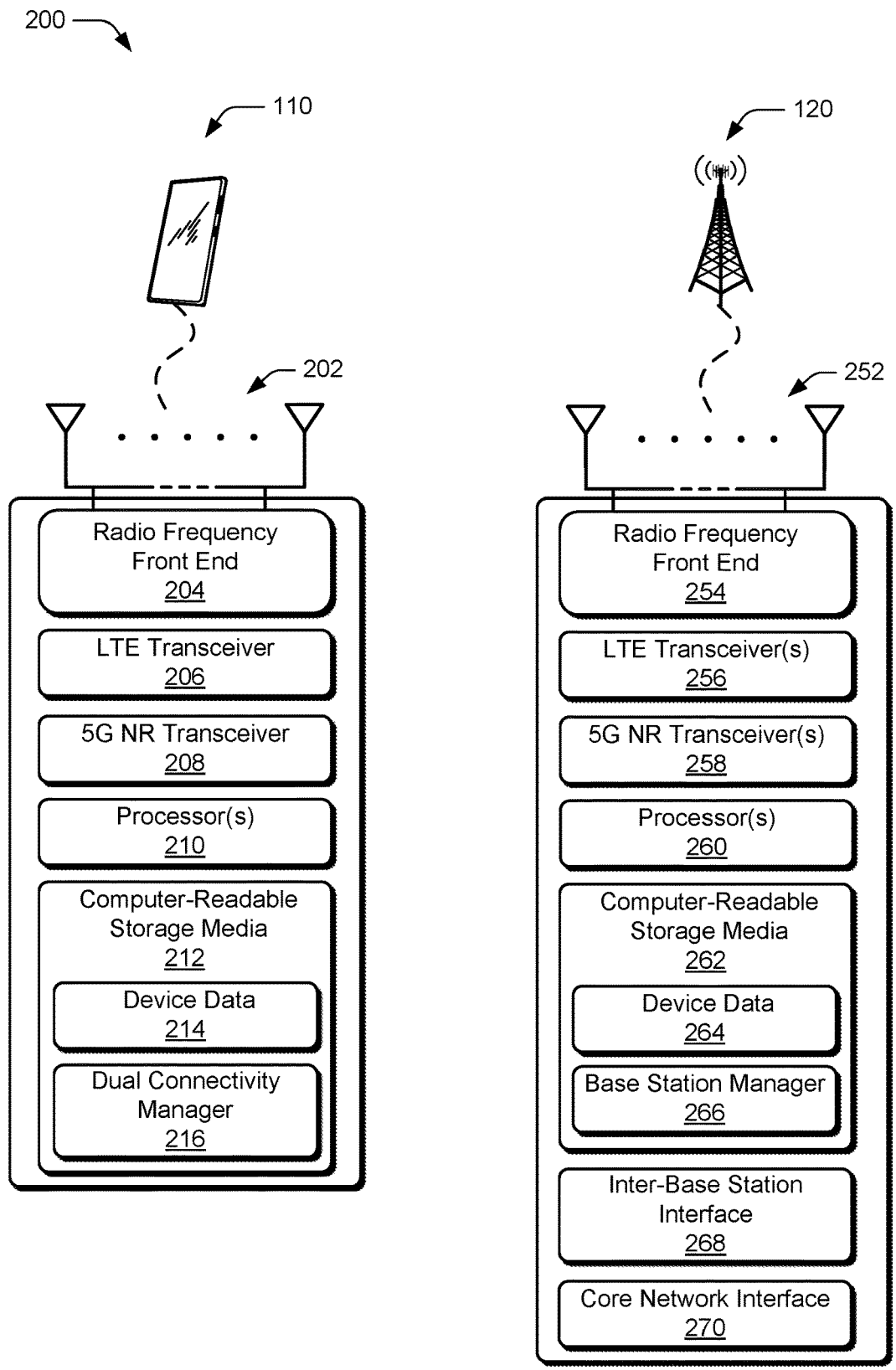
FIG. 2 illustrates an example device diagram that can implement various aspects of dual connectivity capability modification.

FIG. 2 illustrates an example device diagram 200 of the user equipment 110, the base station 121, and the neighbor base station 122. The user equipment 110, the base station 121, and the neighbor base station 122 may include additional functions and interfaces that are omitted from FIG. 2 for the sake of clarity. The user equipment 110 includes antennas 202, a radio frequency front end 204 (RF front end 204), an LTE transceiver 206, and a 5G NR transceiver 208 for communicating with base stations 120. The RF front end 204 of the user equipment 110 can couple or connect the LTE transceiver 206, and the 5G NR transceiver 208 to the antennas 202 to facilitate various types of wireless communication. The LTE transceiver 206 and the 5G NR transceiver 208 may include sensor circuitry and algorithms for measuring characteristics of radio signals and/or sensing in-device coexistence issues. The antennas 202 of the user equipment 110 may include an array of multiple antennas that are configured similar to or differently from each other. The antennas 202 and the RF front end 204 can be tuned to, and/or be tunable to, one or more frequency bands defined by the 3GPP LTE and 5G NR communication standards and implemented by the LTE transceiver 206, and/or the 5G NR transceiver 208. Additionally, the antennas 202, the RF front end 204, the LTE transceiver 206, and/or the 5G NR transceiver 208 may be configured to support beamforming for the transmission and reception of communications with the base station 121, the base station 122, or both. By way of example and not limitation, the antennas 202 and the RF front end 204 can be implemented for operation in sub-gigahertz bands, sub-6 GHZ bands, and/or above 6 GHz bands that are defined by the 3GPP LTE and 5G NR communication standards.

The user equipment 110 also includes processor(s) 210 and computer-readable storage media 212 (CRM 212). The processor 210 may be a single core processor or a multiple core processor composed of a variety of materials, such as silicon, polysilicon, high-K dielectric, copper, and so on. The computer-readable storage media described herein excludes propagating signals. CRM 212 may include any suitable memory or storage device such as random-access memory (RAM), static RAM (SRAM), dynamic RAM (DRAM), non-volatile RAM (NVRAM), read-only memory (ROM), or Flash memory useable to store device data 214 of the user equipment 110. The device data 214 includes user data, multimedia data, beamforming codebooks, applications, and/or an operating system of the user equipment 110, which are executable by processor(s) 210 to enable user-plane communication, control-plane signaling, and user interaction with the user equipment 110.

CRM 212 also includes a dual connectivity manager 216. Alternately or additionally, the dual connectivity manager 216 may be implemented in whole or part as hardware logic or circuitry integrated with or separate from other components of the user equipment 110. In at least some aspects, the dual connectivity manager 216 configures the RF front end 204, the LTE transceiver 206, and/or the 5G NR transceiver 208 to implement the techniques for dual connectivity capability modification described herein. The dual connectivity manager 216 may receive input from other elements in the UE 110, such as the RF front end 204, the LTE transceiver 206, the 5G NR transceiver 208, a temperature sensor (not shown), other radio transceivers (not shown), such as a Wireless Local Area Network (WLAN) transceiver and/or a Bluetooth™ transceiver, or other sensors (not shown), to determine when to signal a change in DC capability.

The device diagram for the base stations 120, shown in FIG. 2, includes a representative single network node (e.g., a gNode B). The functionality of the base stations 120 may be distributed across multiple network nodes or devices and may be distributed in any fashion suitable to perform the functions described herein. The base stations 120 include antennas 252, a radio frequency front end 254 (RF front end 254), one or more LTE transceivers 256, and/or one or more 5G NR transceivers 258 for communicating with the UE 110. The RF front end 254 of the base stations 120 can couple or connect the LTE transceivers 256 and the 5G NR transceivers 258 to the antennas 252 to facilitate various types of wireless communication. The antennas 252 of the base stations 120 may include an array of multiple antennas that are configured similar to or differently from each other. The antennas 252 and the RF front end 254 can be tuned to, and/or be tunable to, one or more frequency band defined by the 3GPP LTE and 5G NR communication standards, and implemented by the LTE transceivers 256, and/or the 5G NR transceivers 258. Additionally, the antennas 252, the RF front end 254, the LTE transceivers 256, and/or the 5G NR transceivers 258 may be configured to support beamforming, such as Massive-MIMO, for the transmission and reception of communications with the UE 110.

The base stations 120 also include processor(s) 260 and computer-readable storage media 262 (CRM 262). The processor 260 may be a single core processor or a multiple core processor composed of a variety of materials, such as silicon, polysilicon, high-K dielectric, copper, and so on. CRM 262 may include any suitable memory or storage device such as random-access memory (RAM), static RAM (SRAM), dynamic RAM (DRAM), non-volatile RAM (NVRAM), read-only memory (ROM), or Flash memory useable to store device data 264 of the base stations 120. The device data 264 includes network scheduling data, radio resource management data, beamforming codebooks, applications, and/or an operating system of the base stations 120, which are executable by processor(s) 260 to enable communication with the UE 110.

CRM 262 also includes a base station manager 266. Alternately or additionally, the base station manager 266 may be implemented in whole or part as hardware logic or circuitry integrated with or separate from other components of the base stations 120. In at least some aspects, the base station manager 266 configures the LTE transceivers 256 and the 5G NR transceivers 258 for communication with the UE 110, as well as communication with a core network. The base stations 120 include an inter-base station interface 268, such as an Xn and/or X2 interface, which the base station manager 266 configures to exchange user-plane and control-plane data between another base station 120 per FIG. 1 link 102, to manage the communication of the base stations 120 with the UE 110. The base stations 120 include a core network interface 270, such as an S1 or NG interface, which the base station manager 266 configures to exchange user-plane and control-plane data with core network functions and entities per FIG. 1 links 104, 106.

User Plane and Control Plane Signaling

Figure 3:
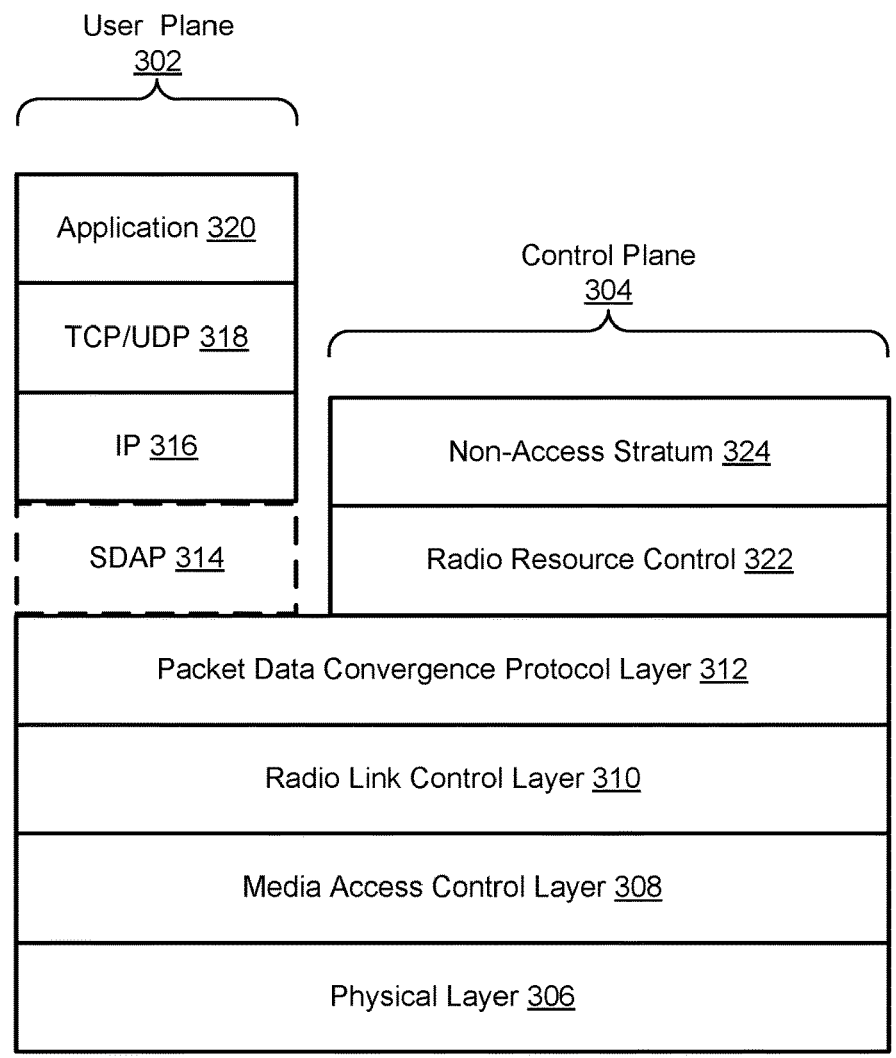
FIG. 3 illustrates an example block diagram of a wireless network stack model that characterizes a communication system with which various aspects of dual connectivity capability modification can be implemented.

FIG. 3 illustrates an example block diagram of a wireless network stack model 300 that characterizes a communication system for the example environment 100, in which various aspects of dual connectivity capability modification can be implemented. The wireless network stack 300 includes a user plane 302 and a control plane 304. Upper layers of the user plane 302 and the control plane 304, share common lower layers in the wireless network stack 300. Wireless devices such as the UE 110 or base stations 120 implement each layer as an entity for communication with another device using the protocols defined for the layer. For example, a UE 110 uses a Packet Data Convergence Protocol (PDCP) entity to communicate to a peer PDCP entity in a base station 120 using the PDCP.

The shared lower layers include a physical layer 306 (PHY layer 306), a Media Access Control layer 308 (MAC layer 308), a Radio Link Control layer 310 (RLC layer 310), and a Packet Data Convergence Protocol layer 312 (PDCP layer 312). The physical layer 306 provides hardware specifications for devices that communicate with each other. As such, the physical layer 306 establishes how devices connect to each other, assists in managing how communication resources are shared among devices, and the like.

The MAC layer 308 specifies how data is transferred between devices. Generally, the MAC layer 308 provides a way in which data packets being transmitted are encoded and decoded into bits as part of a transmission protocol.

The RLC layer 310 provides data transfer services to higher layers in the wireless network stack 300. Generally, the RLC layer 310 provides error correction, packet segmentation and reassembly, and management of data transfers in various modes, such as acknowledged, unacknowledged, or transparent modes.

The PDCP layer 312 provides data transfer services to higher layers in the wireless network stack 300. Generally, the PDCP layer 312 provides transfer of user plane 302 and control plane 304 data, header compression, ciphering, and integrity protection.

Above the PDCP layer 312, the wireless network stack splits into the user-plane stack 302 and the control-plane stack 304. The user plane 302 layers include an optional Service Data Adaptation Protocol layer 314 (SDAP 314), an Internet Protocol layer 316 (IP 316), a Transmission Control Protocol/User Datagram Protocol layer 318 (TCP/UDP 318), and an application 320 that transfer data via the wireless link 130. The optional SDAP layer 314 is present in 5G NR networks and maps a Quality of Service (QoS) flow for each data radio bearer and marks QoS flow identifiers in uplink and downlink data packets for each packet data session. The IP layer 316 specifies how the data from the application 320 is transferred to a destination node. The TCP/UDP layer 318 is used to verify that data packets intended to be transferred to the destination node reached the destination node, using either TCP or UDP for data transfers by the application 320.

The control plane 304 includes Radio Resource Control 322 (RRC 322) and a Non-Access Stratum 324 (NAS 324). The RRC 322 establishes and releases connections and radio bearers, broadcasts system information, performs power control, and so forth. The NAS 324 provides support for mobility management and packet data bearer contexts between the user equipment 110 and entities or functions in the core network, such as the Mobility Management Entity 152 (MME 152), the Access and Mobility Management Function 156 (AMF 156), or the like.

In the UE 110, each layer in both the user plane 302 and the control plane 304 of the wireless network stack 300 interacts with a corresponding peer layer or entity in a base station 120, a core network entity or function, and/or a remote service, to support user applications and control operation of the UE 110 in the RAN 140.

Dual Connectivity Capability Modification

Figure 4:
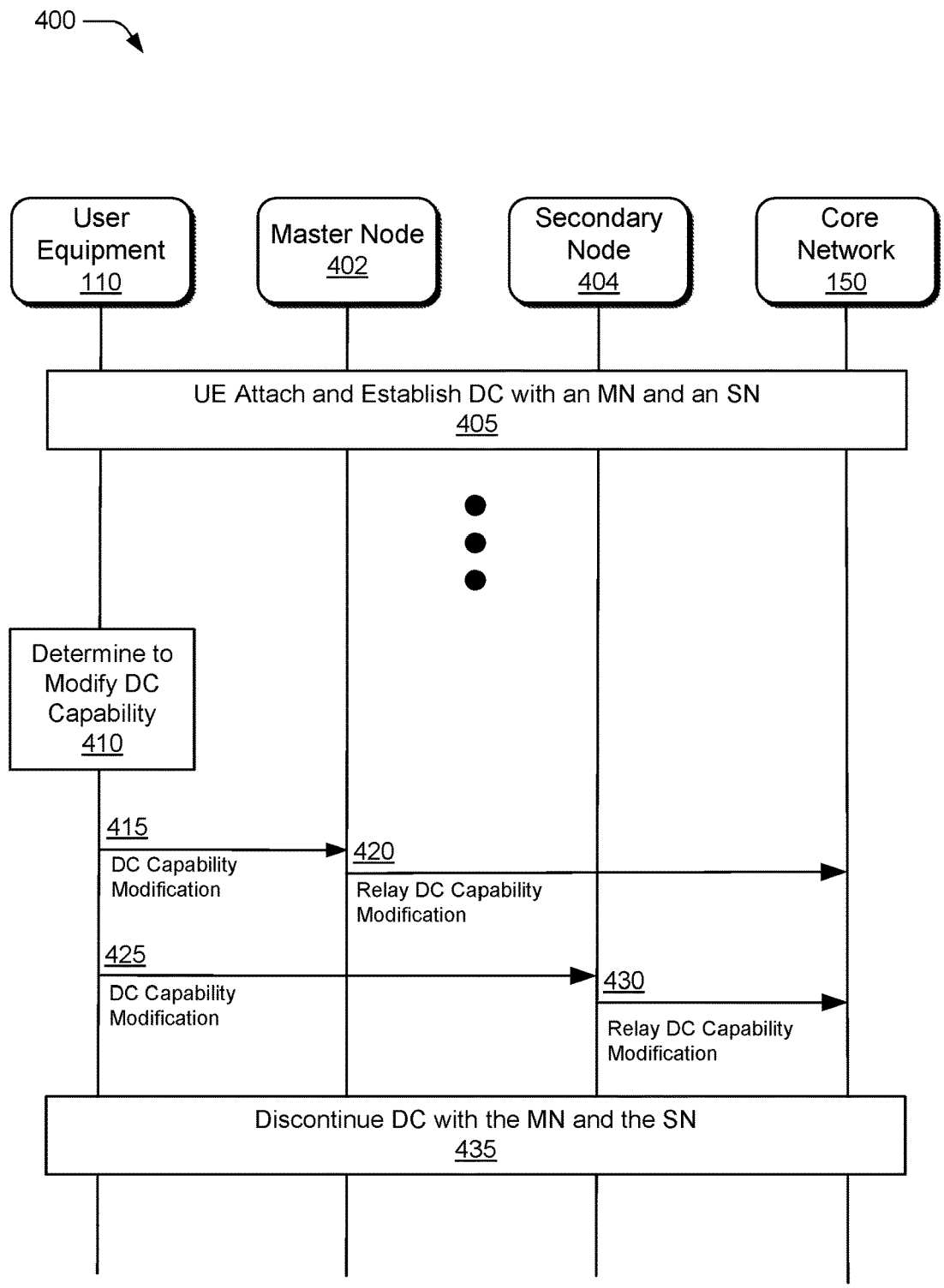
FIG. 4 illustrates example data and control transactions between devices engaged in dual connectivity in accordance with various aspects of dual connectivity capability modification.

FIG. 4 illustrates details of example data and control transactions between devices engaged in dual connectivity of the user equipment 110 from a Master Node (MN) 402 (e.g., the base station 121) and a Secondary Node 404 (e.g., the base station 122) in accordance with various aspects of dual connectivity capability modification. In aspects, the UE 110, the MN 402, the SN 404, and the core network 150 establish MR-DC (EN-DC, NGEN-DC, or NE-DC) or single-RAT DC (LTE-LTE or NR-NR) between the UE 110, and the MN 402 and the SN 404, at 405. The UE 110 includes an indication in an Attach Request message to signal the core network 150 that the UE 110 is capable of establishing DC communications.

After establishing and operating for a period of time using DC, the UE 110 determines to indicate that there is a change in its DC capability at 410. For example, the UE 110 may determine that there is an in-device coexistence issue between radio transceivers in the UE 110 that can be mitigated by discontinuing DC communications, the UE 110 may determine that there is a thermal management (e.g., overheating) problem that can be addressed by discontinuing DC communications, or the like.

At 415 the UE 110 sends an indication of a modification of the DC capability of the UE 110 to the MN 402. Instead of using RRC layer signaling, the UE 110 sends the indication of the modification of the DC capability in UCI via a Physical Uplink Control Channel (PUCCH) or in a MAC CE to the MN 402. Alternatively, the MN 402 may allocate a Random Access Channel (RACH) resource to signal DC capability modification, in which case the UE 110 may transmit the indication of the modification of the DC capability using the allocated RACH resource via a Physical Random Access Channel (PRACH). By using the UCI, MAC CE, or PRACH instead of RRC signaling to communicate the modification of its DC capability, the UE 110 can reduce the signaling latency to communicate the DC capability modification from approximately 10 mSec to less than approximately 1 mSec.

At 420 the MN 402 forwards the modified DC capability of the UE 110 to the core network 150. In a first example, in EN-DC with an EPC 151, the MN 402 (an E-UTRA base station) uses an S1-C-modified-EN-DC-Capability message to relay the modification of the DC capability of the UE 110 to the MME 152 in the EPC 151 via the S1-MME interface. In a second example, in NGEN-DC with an 5GC 155, the MN 402 (an E-UTRA base station) uses an NG-C-modified-NGEN-DC-Capability message to relay the modification of the DC capability of the UE 110 to the AMF 156 in the 5GC 155 via the NG-C interface. In a third example, in NE-DC with an 5GC 155, the MN 402 (a 5G NR base station) uses an NG-C-modified-NE-DC-Capability message to relay the modification of the DC capability of the UE 110 to the AMF 156 in the 5GC 155 via the NG-C interface. In a fourth example, in LTE-LTE DC with an EPC 151, the MN 402 (an E-UTRA base station) uses an S1-C-modified-LTE-LTE-DC-Capability message to relay the modification of the DC capability of the UE 110 to the MME 152 in the EPC 151 via the S1-MME interface. In a fifth example, in NR-NR DC with an 5GC 155, the MN 402 (a 5G NR base station) uses an NG-C-modified-NR-NR-DC-Capability message to relay the modification of the DC capability of the UE 110 to the AMF 156 in the 5GC 155 via the NG-C interface.

Alternatively or additionally, at 425 the UE 110 sends an indication of a modification of the DC capability of the UE 110 to the SN 404. The UE 110 sends the indication of the modification of the DC capability in UCI via a PUCCH or in a MAC CE to the SN 404. Alternatively, the SN 404 may allocate a Random Access Channel (RACH) resource to signal DC capability modification, in which case the UE 110 may transmit the modification to the DC capability using the allocated RACH resource via a PRACH. In another alternative, the UE 110 may use any 5G NR uplink carrier, such as a supplemental uplink, to send the indication of the modification of the DC capability in the UCI or a MAC CE.

At 430, the SN 404 forwards the modified DC capability of the UE 110 to the core network 150. Continuing with the first example, in EN-DC with an EPC 151, the SN 404 (a 5G NR base station) uses an S1-C-modified-EN-DC-Capability message to relay the modification of the DC capability of the UE 110 to the MME 152 in the EPC 151. Continuing with the second example, in NGEN-DC with an 5GC 155, the SN 404 (a 5G NR base station) uses an NG-C-modified-NGEN-DC-Capability message to relay the modification of the DC capability of the UE 110 to the AMF 156 in the 5GC 155 via the NG-C interface. Continuing with the third example, in NE-DC with an 5GC 155, the SN 404 (an E-UTRA base station) uses an NG-C-modified-NE-DC-Capability message to relay the modification of the DC capability of the UE 110 to the AMF 156 in the 5GC 155 via the NG-C interface. Continuing with the fourth example, in LTE-LTE DC with an EPC 151, the SN 402 (an E-UTRA base station) uses an S1-C-modified-LTE-LTE-DC-Capability message to relay the modification of the DC capability of the UE 110 to the MME 152 in the EPC 151. Continuing with the fifth example, in NR-NR DC with an 5GC 155, the SN 402 (a 5G NR base station) uses an NG-C-modified-NR-NR-DC-Capability message to relay the modification of the DC capability of the UE 110 to the AMF 156 in the 5GC 155 via the NG-C interface. Additionally or alternatively in these examples, the DC capability messages from the SN 404 may be relayed by the MN 202 via the Xn-C and/or the NG-C interfaces.

At 435, after transmitting the indication of the modified DC capability, the UE 110 discontinues operation using MR-DC. The MN 402 and/or the SN 404 discontinue MR-DC with the UE 110 and can release resources associated with the DC communications.

Additionally or optionally the UE may further modify the DC capability to reestablish DC communications. The UE 110 may use RRC signaling, the UCI, the MAC CE, or the allocated RACH resource to indicate that it is again capable of DC, such as when an in-device coexistence or thermal problem has been resolved at the UE 110.

Example Methods

Example methods 500 and 600 are described with reference to FIGS. 5 and 6 in accordance with one or more aspects of dual connectivity capability modification. The order in which the method blocks are described are not intended to be construed as a limitation, and any number of the described method blocks can be skipped or combined in any order to implement a method or an alternate method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 5:
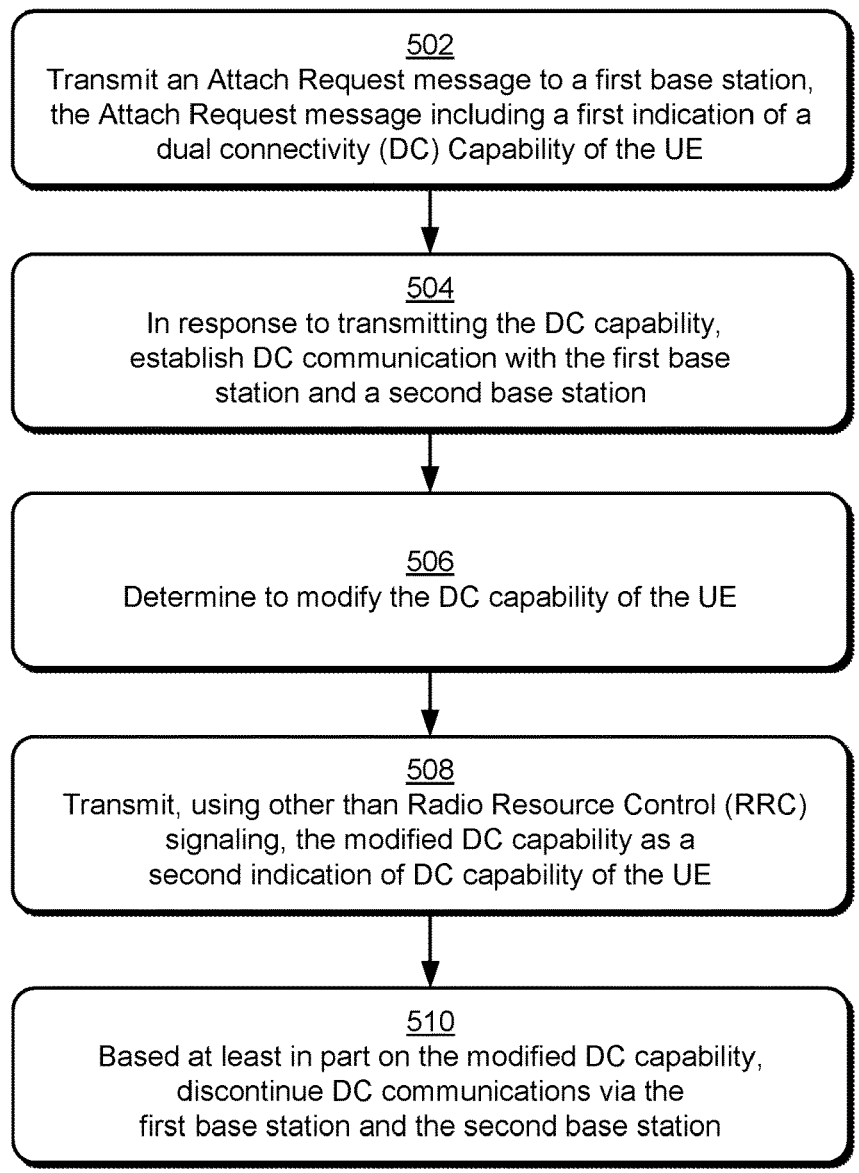
FIG. 5 illustrates an example method of dual connectivity capability modification as generally related to determining and communicating, by the user equipment, a modification of DC capability in accordance with aspects of the techniques described herein.

FIG. 5 illustrates example method(s) 500 of dual connectivity capability modification as generally related to determining and communicating, by the user equipment 110, a modification of DC capability.

At block 502, a user equipment (e.g., UE 110) transmits an Attach Request message to a first base station (e.g., base station 121), the Attach Request message including a first indication of a DC capability of the UE.

At block 504, in response to transmitting the DC capability, the UE establishes DC communication with the first base station and a second base station (e.g., base station 122).

At block 506, the UE determines to modify the DC capability of the UE. For example, the UE determines to discontinue DC communications to address an in-device coexistence or thermal management issue in the UE.

At block 508, the UE transmits, using other than Radio Resource Control (RRC) signaling, the modified DC capability as a second indication of DC capability of the UE. For example, the UE transmits the second indication in UCI, MAC CE, or using an allocated RACH resource via a PRACH.

At block 510, based at least in part on the modified DC capability, the UE discontinues DC communications via the first base station and the second base station.

Figure 6:
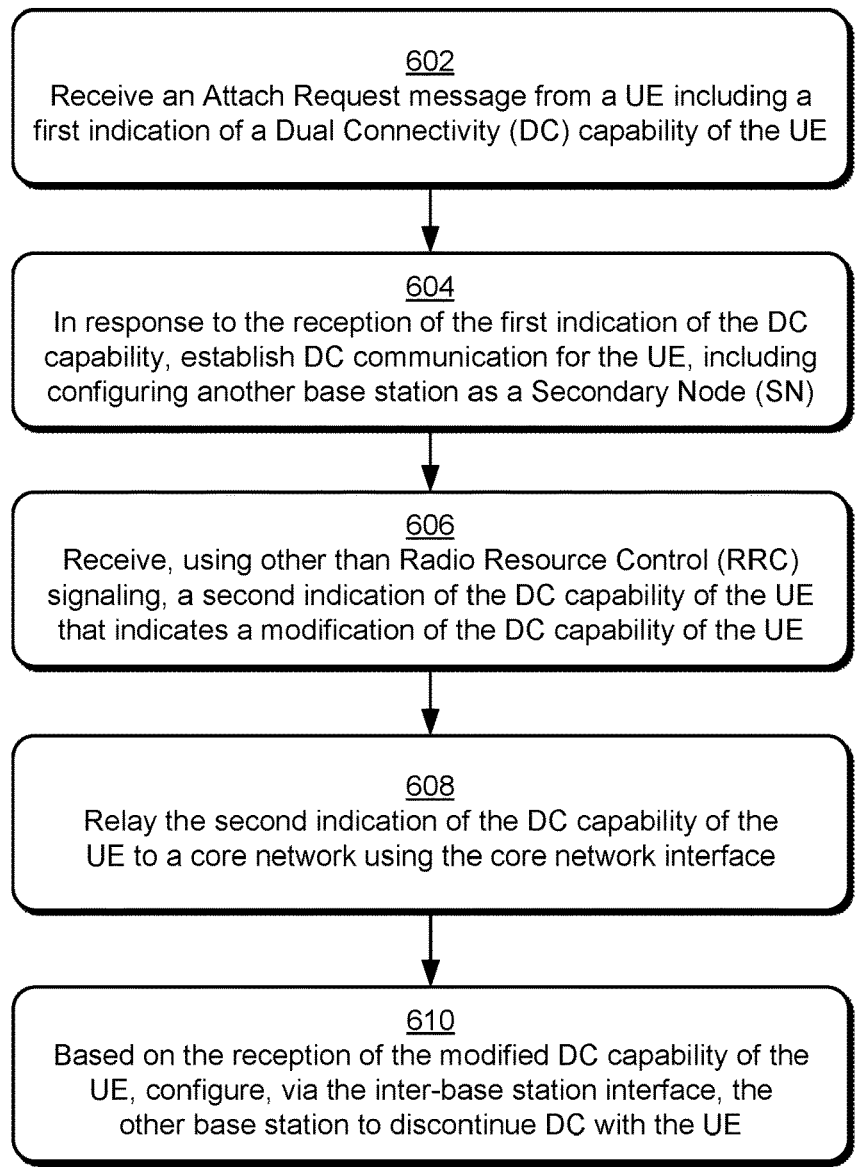
FIG. 6 illustrates an example method of dual connectivity capability modification as generally related to a base station receiving an indication of a modified DC capability from a UE in accordance with aspects of the techniques described herein.

FIG. 6 illustrates example method(s) 600 of dual connectivity capability modification as generally related to a base station receiving an indication of a modified DC capability from a UE.

At block 602, a base station (e.g., base station 121) receives, via an RF transceiver, an Attach Request message from a UE (e.g., UE 110) including a first indication of a Dual Connectivity (DC) capability of the UE.

At block 604, in response to the reception of the first indication of the DC capability, the base station establishes DC communication for the UE, including configuring another base station (e.g., base station 122) as a Secondary Node (SN) via an inter-base station interface (e.g., an X2-C or Xn-C interface).

At block 606, the base station receives, using other than Radio Resource Control (RRC) signaling, a second indication of the DC capability of the UE that indicates a modification of the DC capability of the UE. For example, the base station receives the second indication in UCI, MAC CE, or using an allocated RACH resource via a PRACH.

At block 608, the base station relays the second indication of the DC capability of the UE to a core network using the core network interface (e.g., interface 270). For example, the base station may relay the second indication of the DC capability of the UE to the MME 152 in an EPC 151 via the S1-MME interface, or the base station may relay the second indication of the DC capability of the UE to the AMF 156 in an 5GC 155 via the NG-C interface depending on its MR-DC configuration.

At block 610, based on the reception of the modified DC capability of the UE, the base station configures, via the inter-base station interface (e.g., interface 268), the other base station to discontinue DC with the UE.

Although aspects of dual connectivity capability modification have been described in language specific to features and/or methods, the subject of the appended claims is not necessarily limited to the specific features or methods described. Rather, the specific features and methods are disclosed as example implementations of dual connectivity capability modification, and other equivalent features and methods are intended to be within the scope of the appended claims. Further, various different aspects are described, and it is to be appreciated that each described aspect can be implemented independently or in connection with one or more other described aspects.

What is claimed is:

1. A method for communicating a modification of dual connectivity (DC) capability by a user equipment (UE) in a cellular network, the method comprising:

transmitting, by the UE, an Attach Request message to a first base station of a radio access network (RAN), the Attach Request message including a first indication of a DC capability of the UE;

in response to the transmitting the first indication, establishing DC communication with the first base station and a second base station of the RAN;

determining, by the UE, to modify the DC capability of the UE;

transmitting, at a physical layer or a Media Access Control (MAC) layer, the modified DC capability of the UE as a second indication of the DC capability of the UE, the transmitting the second indication of the DC capability of the UE being effective to cause the RAN to relay the second indication of the DC capability of the UE to a core network; and based at least in part on the modified DC capability of the UE, discontinuing DC communications using the first base station and the second base station.

2. The method of claim 1, wherein the transmitting the second indication of the DC capability of the UE comprises:

including the second indication in an Uplink Control Information (UCI) at the physical layer or in a Control Element (CE) at the Media Access Control (MAC) layer; or using a Random Access Channel (RACH) resource using a Physical Random Access Channel (PRACH) as allocated by the RAN for signaling DC capability.

3. The method of claim 1, wherein the first base station is an Evolved Universal Terrestrial Radio Access (E-UTRA) base station, wherein the core network is a Fifth Generation New Radio (5G NR) core (5GC) network including an Access and Mobility Management Function (AMF).

4. The method of claim 3, wherein the second base station is a 5G NR base station, and wherein the transmitting the second indication of the DC capability of the UE comprises:

sending the second indication, at the physical layer or the MAC layer, to the second base station that is effective to cause the second base station to relay the second indication of the DC capability of the UE to the AMF using an S1-C-modified-EN-DC-Capability message.

5. The method of claim 1, further comprising:

determining, by the UE, to further modify the DC capability of the UE; and transmitting the further modified DC capability of the UE as a third indication of a DC capability of the UE using RRC signaling, Uplink Control Information (UCI), a Media Access Control (MAC) layer Control Element (CE), or an allocated Random Access Channel (RACH) resource using a Physical Random Access Channel (PRACH), that is effective to reestablish DC communications.

6. The method of claim 1, wherein the determining comprises:

sensing a temperature by the UE; or sensing an in-device coexistence issue from one or more radio transceivers in the UE.

7. A base station configured as a Master Node (MN) for Dual Connectivity (DC) communication, the base station comprising:

a radio frequency (RF) transceiver;

a core network interface;

an inter-base station interface; and a processor and memory system to implement a base station manager application configured to:

receive, using the RF transceiver, an Attach Request message from a user equipment (UE) including a first indication of a DC capability of the UE;

in response to the reception of the first indication of the DC capability of the UE, establish DC communication for the UE, including configuring another base station as a Secondary Node (SN) using the inter-base station interface;

receive, at a physical layer or a Media Access Control (MAC) layer, a second indication of the DC capability of the UE that indicates a modification of the DC capability of the UE;

relay the second indication of the DC capability of the UE to a core network using the core network interface; and based on the reception of the second indication, configure, using the inter-base station interface, the other base station to discontinue DC with the UE.

8. The base station of claim 7, wherein the second indication of the DC capability of the UE is received in Uplink Control Information (UCI) at the physical layer from the UE or in a Control Element (CE) at the Media Access Control (MAC) layer from the UE.

9. The base station of claim 7, wherein the base station manager application is configured to:

allocate a Random Access Channel (RACH) resource to signal DC capability by the UE; and receive the second indication of the DC capability of the UE using the allocated RACH resource using a Physical Random Access Channel (PRACH).

10. The base station of claim 7, wherein the base station is an Evolved Universal Terrestrial Radio Access (E-UTRA) base station, wherein the core network is an Evolved Packet Core (EPC) network including a Mobility Management Entity (MME), wherein the core network interface is an S1-MME interface, and wherein the base station manager application is configured to:

relay, using the S1-MME interface to the MME, the second indication of the DC capability of the UE using an S1-C-modified-EN-DC-Capability message.

11. The base station of claim 7, wherein the base station is an Evolved Universal Terrestrial Radio Access (E-UTRA) base station, wherein the core network is a Fifth Generation New Radio (5G NR) core (5GC) network including an Access and Mobility Management Function (AMF), wherein the core network interface is an NG-C interface, and wherein the base station manager application is configured to:

relay, using the NG-C interface to the AMF, the second indication of the DC capability of the UE using an NG-C-modified-EN-DC-Capability message.

12. A method for communicating a user equipment (UE) capability for multi-Radio Access Technology (Multi-RAT) Dual Connectivity (DC) by a base station, the method comprising:

receiving, by the base station, an Attach Request message from the UE including a first indication of a DC capability of the UE;

in response to the receiving the first indication, establishing DC communication for the UE, including configuring another base station as a Secondary Node (SN);

receiving, at a physical layer or a Media Access Control layer, a second indication of the DC capability of the UE that indicates a modification of the DC capability of the UE;

relaying the second indication of the DC capability of the UE to a core network; and based on the receiving the second indication, configuring, using an inter-base station interface, the other base station to discontinue DC with the UE.

13. The method of claim 12, the method comprising:

receiving, by the base station, the second indication of the DC capability of the UE in Uplink Control Information (UCI) at the physical layer or in a Control Element (CE) at the Media Access Control (MAC) layer.

14. The method of claim 12, the method comprising:

allocating, by the base station, a Random Access Channel (RACH) resource to signal DC capability by the UE; and receiving the second indication of the DC capability of the UE using the allocated RACH resource using a Physical Random Access Channel (PRACH).

15. The method of claim 12, wherein the base station is an Evolved Universal Terrestrial Radio Access (E-UTRA) base station, wherein the core network is an Evolved Packet Core (EPC) network including a Mobility Management Entity (MME), wherein the core network interface is an S1-MME interface, and wherein the method further comprises:

relaying, using the S1-MME interface to the MME, the second indication of the DC capability of the UE using an S1-C-modified-EN-DC-Capability message.

16. The method of claim 12, wherein the base station is an Evolved Universal Terrestrial Radio Access (E-UTRA) base station, wherein the core network is a Fifth Generation New Radio (5G NR) core (5GC) network including an Access and Mobility Management Function (AMF), wherein the core network interface is an NG-C interface, and wherein the method further comprises:

relaying, using the NG-C interface to the AMF, the second indication of the DC capability of the UE using an NG-C-modified-EN-DC-Capability message.

17. The method of claim 12, the method comprising:

receiving a third indication of a DC capability of the UE using Radio Resource Control (RRC) signaling, Uplink Control Information (UCI), a Media Access Control (MAC) Control Element (CE), or an allocated Random Access Channel (RACH) resource using a Physical Random Access Channel (PRACH); and establishing DC communication for the UE, including configuring the other base station as the SN using the inter-base station interface.

18. A method for communicating a modification of dual connectivity (DC) capability by a user equipment (UE) in a cellular network, the method comprising:

transmitting, by the UE, an Attach Request message to a first base station, the Attach Request message including a first indication of a DC capability of the UE;

in response to the transmitting the first indication, establishing DC communication with the first base station and a second base station;

determining, by the UE, to modify the DC capability of the UE based on:

sensing a temperature by the UE; or sensing an in-device coexistence issue from one or more radio transceivers in the UE;

transmitting, at a physical layer or a Media Access Control (MAC) layer, the modified DC capability of the UE as a second indication of the DC capability of the UE; and based at least in part on the modified DC capability of the UE, discontinuing DC communications using the first base station and the second base station.

19. The method of claim 18, wherein the transmitting the second indication of the DC capability of the UE comprises:

including the second indication in Uplink Control Information (UCI) at the physical layer or in a Control Element (CE) at the Media Access Control (MAC) layer; or using a Random Access Channel (RACH) resource using a Physical Random Access Channel (PRACH) as allocated by the RAN for signaling DC capability.

20. The method of claim 18, wherein the transmitting the second indication of the DC capability of the UE is effective to cause the RAN to relay the second indication of the DC capability of the UE to a core network.

21. A user equipment (UE) configured for communication using dual connectivity (DC) capability in a cellular network, the UE comprising:
   a radio frequency (RF) transceiver; and
   a processor and memory system to implement a dual connectivity manager application configured to:
      transmit, using the RF transceiver, an Attach Request message to a first base station of a radio access network (RAN), the Attach Request message including a first indication of a DC capability of the UE;
      in response to the transmission of the first indication, establish DC communication with the first base station and a second base station of the RAN;
      determine to modify the DC capability of the UE;
      transmit, at a physical layer or a Media Access Control (MAC) layer, the modified DC capability of the UE as a second indication of the DC capability of the UE, the transmission of the second indication of the DC capability of the UE being effective to cause the RAN to relay the second indication of the DC capability of the UE to a core network; and
      based at least in part on the modified DC capability of the UE, discontinue DC communications using the first base station and the second base station.

22. A user equipment (UE) configured for communication using dual connectivity (DC) capability in a cellular network, the UE comprising:
   a radio frequency (RF) transceiver; and
   a processor and memory system to implement a dual connectivity manager application configured to:
      transmit, using the RF transceiver, an Attach Request message to a first base station, the Attach Request message including a first indication of a DC capability of the UE;
      in response to the transmission of the first indication, establish DC communication with the first base station and a second base station;
   determine to modify the DC capability of the UE based on:
      sensing a temperature by the UE; or
      sensing an in-device coexistence issue from one or more radio transceivers in the UE;
      transmit, at a physical layer or a Media Access Control (MAC) layer, the modified DC capability of the UE as a second indication of the DC capability of the UE; and
      based at least in part on the modified DC capability of the UE, discontinue DC communications using the first base station and the second base station.

* * * * *